US012793191B2

(12) United States Patent
Balke et al.

(10) Patent No.: US 12,793,191 B2
(45) Date of Patent: Nov. 10, 2026

(54) MAPPING A LOW RESOLUTION, NOISY TONE MAPPING OPERATION ONTO HIGH RESOLUTION IMAGES

(71) Applicant: Samsung Electronics Co., Ltd., Suwon-si (KR)

(72) Inventors: Thilo Balke, Plano, TX (US); Hamid Rahim Sheikh, Allen, TX (US); John Seokjun Lee, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 18/940,676

(22) Filed: Nov. 7, 2024

(65) Prior Publication Data

US 2026/0030731 A1 Jan. 29, 2026

Related U.S. Application Data

(60) Provisional application No. 63/676,645, filed on Jul. 29, 2024.

(51) Int. Cl.

| | |
|---|---|
| ***G06T 3/18*** | (2024.01) |
| ***G06T 3/4015*** | (2024.01) |
| ***G06T 5/70*** | (2024.01) |
| ***G06T 5/92*** | (2024.01) |
| ***G06V 10/75*** | (2022.01) |

(52) U.S. Cl.

CPC .................. *G06T 5/92* (2024.01); *G06T 3/18* (2024.01); *G06T 3/4015* (2013.01); *G06T 5/70* (2024.01); *G06V 10/758* (2022.01)

(58) Field of Classification Search

CPC ........... G06T 5/92; G06T 3/18; G06T 3/4015; G06T 5/70; G06T 2207/20016; G06T 5/40; G06V 10/758

See application file for complete search history.

(56) References Cited

U.S. PATENT DOCUMENTS

| | | | | |
|---|---|---|---|---|
| 2018/0098094 A1* | 4/2018 | Wen | ..................... | H04N 19/136 |
| 2022/0207658 A1* | 6/2022 | Tong | .......................... | G06T 5/20 |
| 2024/0020807 A1* | 1/2024 | Tico | ........................ | G06N 3/045 |
| 2024/0153055 A1* | 5/2024 | Bonnier | ..................... | G06T 5/92 |
| 2024/0404011 A1* | 12/2024 | Maekelae | ................. | G06T 5/10 |

OTHER PUBLICATIONS

Wikipedia.com, “Histogram Matching,” Feb. 7, 2022, retrieved from URL <https://en.wikipedia.org/wiki/Histogram_matching>, 6 pages.

* cited by examiner

*Primary Examiner* — Han Hoang

(57) ABSTRACT

To employ low resolution, noisy tone mapping operations for high resolution images, at least one raw image frame is converted to a first image at a higher resolution and a second image at a lower resolution. Tone mapping is applied to the second image to derive a third image at the lower resolution. Histogram matching and regularization are performed to determine a lookup table approximating histogram matching of the second image to the third image. A global gain map is derived based on luma for the first image and the lookup table. A local gain map is derived by up-sampling and denoising residual differences between the third image and the lookup table applied to the second image. Based on the global gain map and the local gain map, a total gain map is determined for tone mapping the first image to produce a fourth image at the first resolution.

20 Claims, 21 Drawing Sheets

FIGURE 14B
Direct Gain Map
$y^{RGB} = GM_{direct} * x^{RGB}$
1401
Halos

MAPPING A LOW RESOLUTION, NOISY TONE MAPPING OPERATION ONTO HIGH RESOLUTION IMAGES

CROSS-REFERENCE TO RELATED APPLICATIONS AND PRIORITY CLAIM

This application claims priority under 35 U.S.C. § 119(e) to U.S. Provisional Patent Application No. 63/676,645 filed on Jul. 29, 2024. The content of the above-identified patent document(s) is hereby incorporated by reference.

TECHNICAL FIELD

This disclosure relates generally to tone mapping during image processing. More specifically, this disclosure relates to tone mapping high resolution images with less artifacts.

BACKGROUND

In digital camera imaging, processing images in a reasonable amount of time with limited compute memory is essential. A significant challenge arises from these constraints for tone mapping, which ideally requires the entire full resolution image to be accessible in memory. In practice, however, the tone mapping algorithm may need to run at a lower resolution, noisy image, to meet demands in processing time or limitations in memory availability, etc. After the tone mapping is run on a lower resolution image, the tone mapping operation needs to be translated onto the high resolution image.

One approach uses either an up-sampled and filtered gain map (direct gain map) or a set of smoothly spatially varying look-up-tables (LUTs) (profile gain table map (PGTM)). Both approaches cause issues such as stains in smooth regions, halos around edges, and detail loss. As a confounding effect, these artifacts limit the amount of contrast enhancement that can be applied without also excessively enhancing the artifacts—which in return results in images that either lack in contrast or have severely visible halo and stain artifacts.

SUMMARY

This disclosure relates to employing low resolution, noisy tone mapping operations for high resolution images.

In a first embodiment, a method includes converting at least one raw image frame to a first image at a first resolution and a second image at a second resolution, wherein the second resolution is lower than the first resolution. The method also includes applying tone mapping to the second image to derive a third image at the second resolution. The method further includes performing histogram matching and regularization using the second image and the third image to determine a lookup table approximating histogram matching of the second image to the third image. The method still further includes deriving a global gain map for tone mapping based on luma for the first image and the lookup table. The method includes deriving a local gain map by up-sampling and denoising residual differences between the third image and the lookup table applied to the second image after regularization of the lookup table. The method includes, based on the global gain map and the local gain map, determining a total gain map for tone mapping the first image to produce a fourth image at the first resolution.

In a second embodiment, an electronic device includes a memory storing image data and at least one processing device. The at least one processing device is configured to convert at least one raw image frame to a first image at a first resolution and a second image at a second resolution, wherein the second resolution is lower than the first resolution. The at least one processing device is also configured to apply tone mapping to the second image to derive a third image at the second resolution. The at least one processing device is further configured to perform histogram matching and regularization using the second image and the third image to determine a lookup table approximating histogram matching of the second image to the third image. The at least one processing device is still further configured to derive a global gain map for tone mapping based on luma for the first image and the lookup table. The at least one processing device is configured to derive a local gain map by up-sampling and denoising residual differences between the third image and the lookup table applied to the second image after regularization of the lookup table. The at least one processing device is configured to determine a total gain map for tone mapping the first image, based on the global gain map and the local gain map, to produce a fourth image at the first resolution.

In a third embodiment, a non-transitory machine-readable medium includes instructions that, when executed, cause at least one processor to convert at least one raw image frame to a first image at a first resolution and a second image at a second resolution, wherein the second resolution is lower than the first resolution. The instructions, when executed, also cause at least one processor to apply tone mapping to the second image to derive a third image at the second resolution. The instructions, when executed, further cause at least one processor to perform histogram matching and regularization using the second image and the third image to determine a lookup table approximating histogram matching of the second image to the third image. The instructions, when executed, still further cause at least one processor to derive a global gain map for tone mapping based on luma for the first image and the lookup table. The instructions, when executed, cause at least one processor to derive a local gain map by up-sampling and denoising residual differences between the third image and the lookup table applied to the second image after regularization of the lookup table. The instructions, when executed, also cause at least one processor to determine a total gain map for tone mapping the first image, based on the global gain map and the local gain map, to produce a fourth image at the first resolution.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 15D, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

The present disclosure describes a new way to apply the tone mapping from a lower resolution, noisy image to the higher resolution, high dynamic range (HDR) images. The hybrid approach disclosed is based on using a global LUT combined with a local gain map to map the residual local tone. The approach works on the high resolution, high dynamic range images, low resolution, high dynamic range images, and low resolution, low dynamic range (LDR) images of the tone mapping pipeline. The global LUT is found via a histogram match of the high dynamic range image to the low resolution, low dynamic range image with subsequent regularization. This global mapping captures a great deal of the tone mapping operation, such that the residual local tone is comparatively small. The residual local tone is expressed through a gain map that is up-sampled, denoised and then applied to the high resolution image in conjunction with the global tone map. The blurring that stems from up-sampling and denoising does not cause major degradation (such as possible halos) because the local tone has comparatively small amplitude. The final outputs have no halos/stain caused by the tone map application, and also do not produce any contrast degradation. Additionally, since the local tone gain map can be filtered more strongly without causing artifacts, the resulting noise is reduced compared to the previous, direct gain map approach. As a final step, the gain map is refined in order to enhance detail which is not accessible in the low resolution, low dynamic range image.

Figure 1:
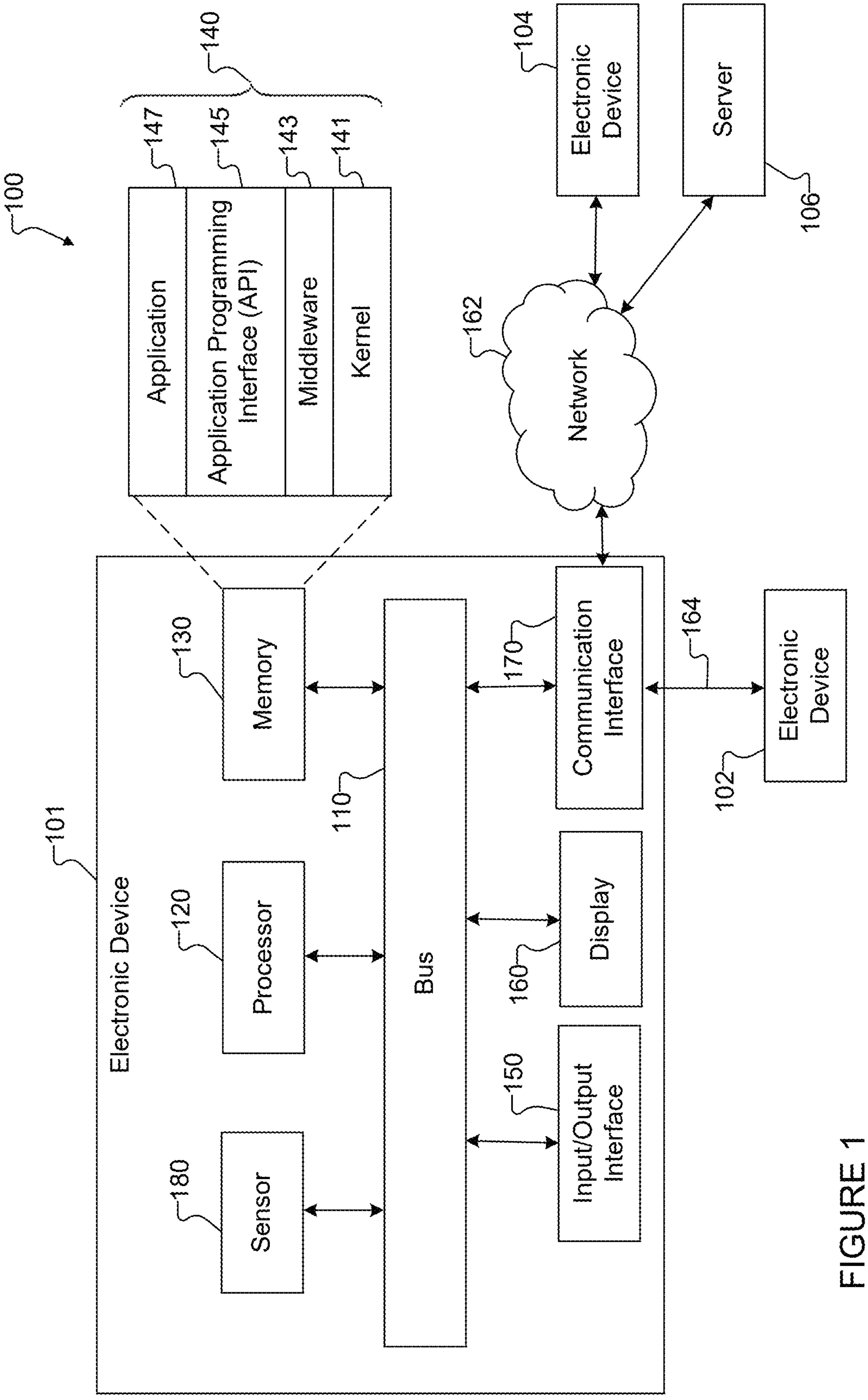
FIG. 1 illustrates an example network configuration which may be employed in conjunction with employing low resolution, noisy tone mapping operations for high resolution images in accordance with this disclosure.

FIG. 1 illustrates an example network configuration which may be employed in conjunction with employing low resolution, noisy tone mapping operations for high resolution images in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to employing low resolution, noisy tone mapping operations for high resolution images.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to employing low resolution, noisy tone mapping operations for high resolution images. For example, the application 147 may include a voice assistant function. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as a head mounted display (or "HMD")). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, which include one or more imaging sensors, or a VR or XR headset.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to employing low resolution, noisy tone mapping operations for high resolution images.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
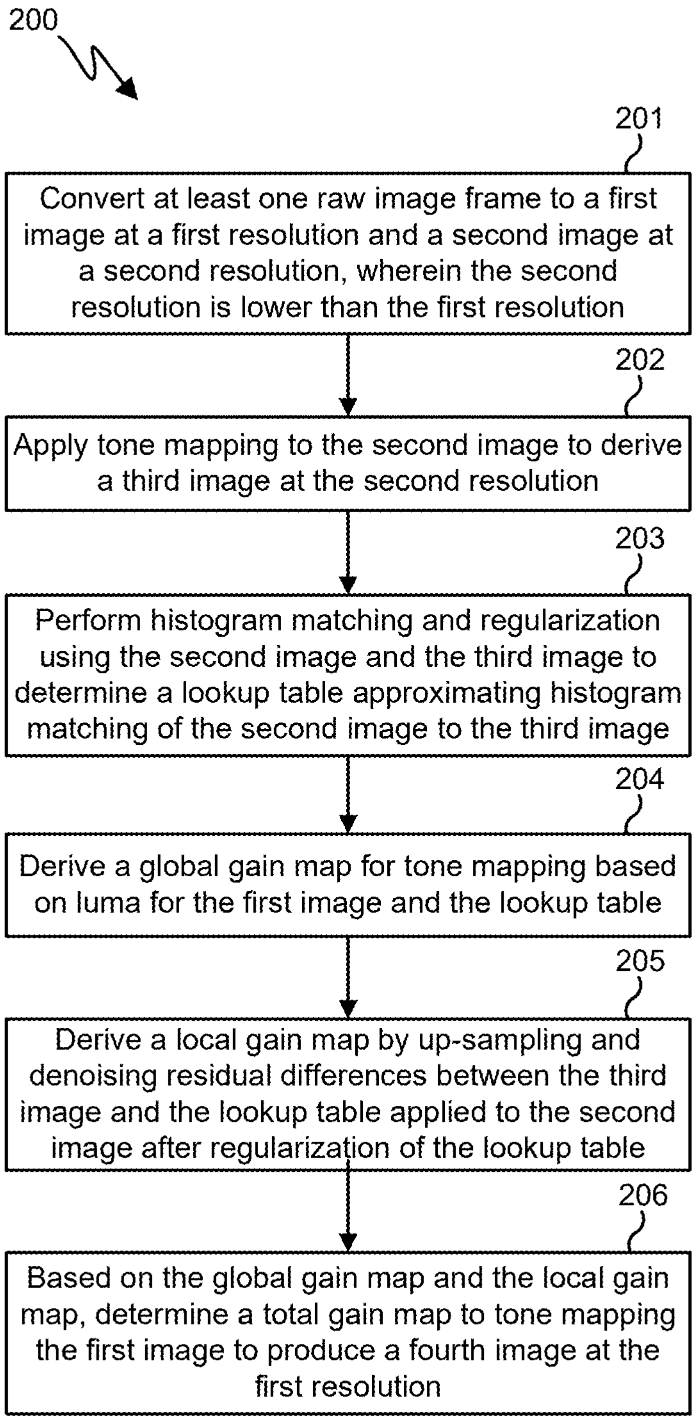
FIG. 2 illustrates an example process of employing low resolution, noisy tone mapping operations for high resolution images in accordance with this disclosure.

FIG. 2 illustrates an example process 200 of employing low resolution, noisy tone mapping operations for high resolution images in accordance with this disclosure. For case of explanation, the process 200 of FIG. 2 is described as being performed using the electronic device 101 in the network configuration 100 of FIG. 1. However, the process 200 may be performed using any other suitable device(s) and in any other suitable system(s).

As shown in FIG. 2, the process 200 begins with converting at least one raw image frame to a first image at a first resolution and a second image at a second resolution, wherein the second resolution is lower than the first resolution (step 201). The first resolution may be relatively high resolution, while the second resolution may be a relatively low resolution. Tone mapping is applied to the second image to derive a third image at the second resolution (step 202). The tone mapping applied to the second image may be essentially a variant of the direct gain map approach, since low resolutions are involved, and relates to a global gain map. Histogram matching and regularization are performed using the second image and the third image to determine a lookup table approximating histogram matching of the second image to the third image (step 203). Histogram matching ensures that a residual (local) gain not accounted for by a global gain map is accounted for, and regularization avoids discontinuities. A global gain map for tone mapping is derived based on luma for the first image and the lookup table (step 204). The global gain map may be derived from a ratio of the luma for the first image and the lookup table applied to the luma for the first image. Application of the global gain map to the first image produces an image having the first resolution, but also possibly exhibiting issues such as halos, noise, or contrast or texture loss. A local gain map is derived by up-sampling and denoising residual differences between the third image and the lookup table applied to the second image after regularization of the lookup table (step 205). The local gain map may be derived from a ratio of the third image and the lookup table applied to the second image. Based on the global gain map and the local gain map, a total gain map is determined for tone mapping the first image to produce a fourth image at the first resolution (step 206). That is, applying the global gain map to the first image will produce a tone-mapped image at the first resolution, typically without defects such as halos, noise, contrast loss, or texture loss.

Although FIG. 2 illustrates one example of a process 200 of employing low resolution, noisy tone mapping operations for high resolution images, various changes may be made to FIG. 2. For example, while shown as a series of steps, various steps in FIG. 2 could overlap, occur in parallel, occur in a different order, or occur any number of times (including zero times).

Figure 3:
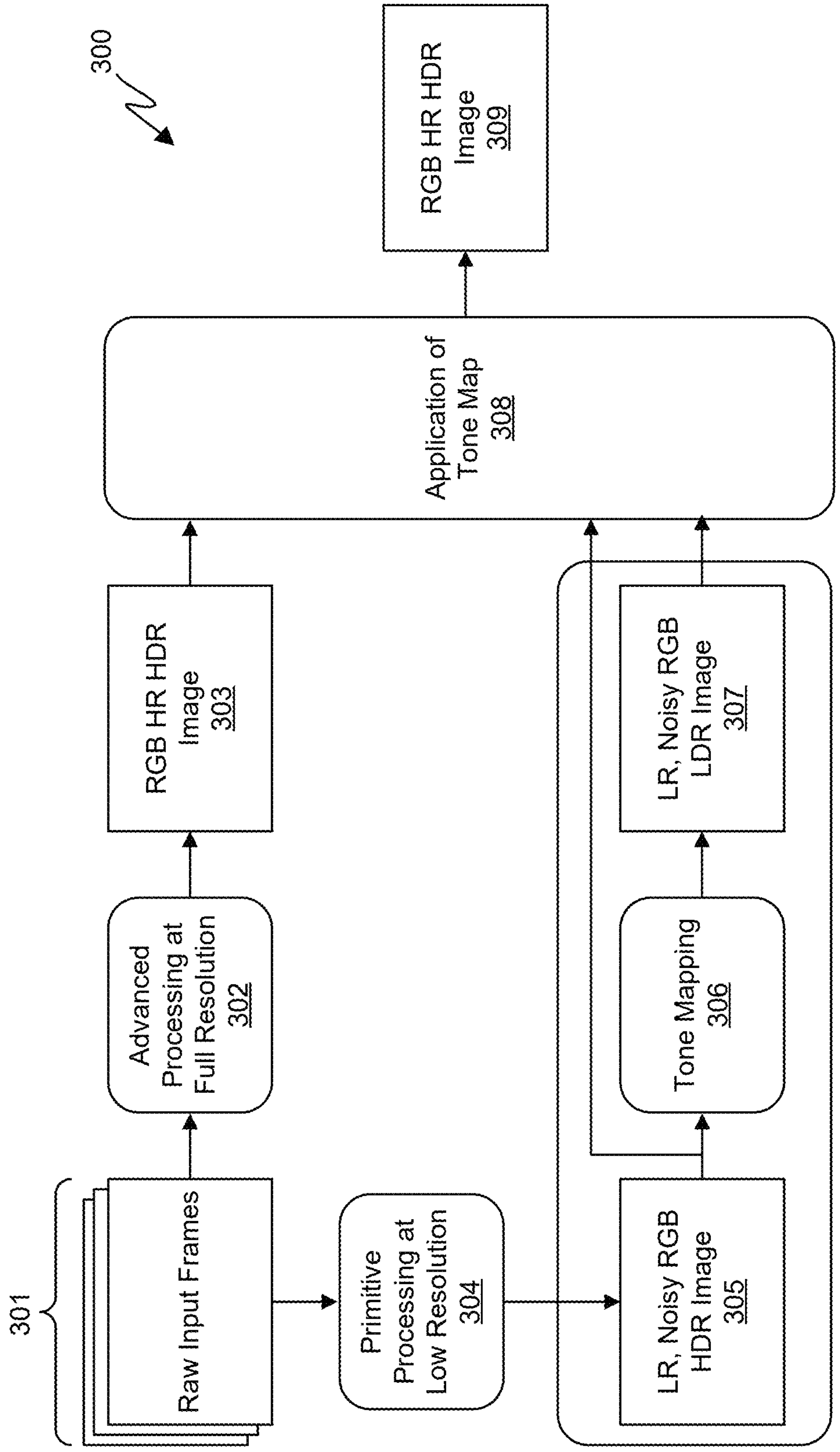
FIG. 3 illustrates an example pipeline for employing low resolution, noisy tone mapping operations for high resolution images in accordance with this disclosure.

FIG. 3 illustrates an example pipeline 300 for employing low resolution, noisy tone mapping operations for high resolution images in accordance with this disclosure. For ease of explanation, the pipeline 300 of FIG. 3 is described as being used by the electronic device 101 in the network configuration 100 of FIG. 1. However, the pipeline 300 may be used by any other suitable device(s) and in any other suitable system(s).

As shown in FIG. 3, the pipeline 300 receives a set of one or more raw input frames 301. When image sizes are large, tone mapping of the raw input frames 301 at full resolution may not be acceptable for certain user applications since such processing is too slow and requires too much memory, particularly when the high resolution, high dynamic range image is only available in tiles and after long processing. In the pipeline 300, the raw input frames 301 are subject to advanced processing 302 at full resolution. For example, one or more of warping, blending, demosaicing, and the like may be performed on the raw input frames 301 at full resolution during advanced processing 302. However, tone mapping is not performed during advanced processing 302. The output of advance processing 302 is a red-green-blue (RGB), high resolution, high dynamic range image 303 ($X^{RGB}$).

Concurrently with advanced processing 302 in the pipeline 300, the raw input frames 301 are subject to primitive processing 304 at low resolution. As with advanced processing 302, one or more of warping, blending, demosaicing, and the like may be performed on the raw input frames 301 at low resolution during primitive processing 304. The output of primitive processing is a low resolution, noisy, RGB, high dynamic range image 305 ($x^{RGB}$).

In a direct gain map approach to tone mapping, a low resolution, noisy, high dynamic range image $x^{RGB}$ can be available early in the image processing pipeline and is employed for faster, low memory tone mapping to generate a low resolution, low dynamic range image $y^{RGB}$ using an up-sampled gain map $$GM_0 = \uparrow\left(\frac{y^{RBG}}{x^{RGB}}\right)X^{RGB},$$

to apply/translate tone mapping to the high resolution, high dynamic range image $X^{RGB}$ as tiles for that image become available:

$$Y^{RGB} = \uparrow\left(\frac{y^{RGB}}{x^{RGB}}\right)X^{RGB} = GM_{direct}X^{RGB}.$$

Figures 4A, 4B, 4C, 4D, 4E:
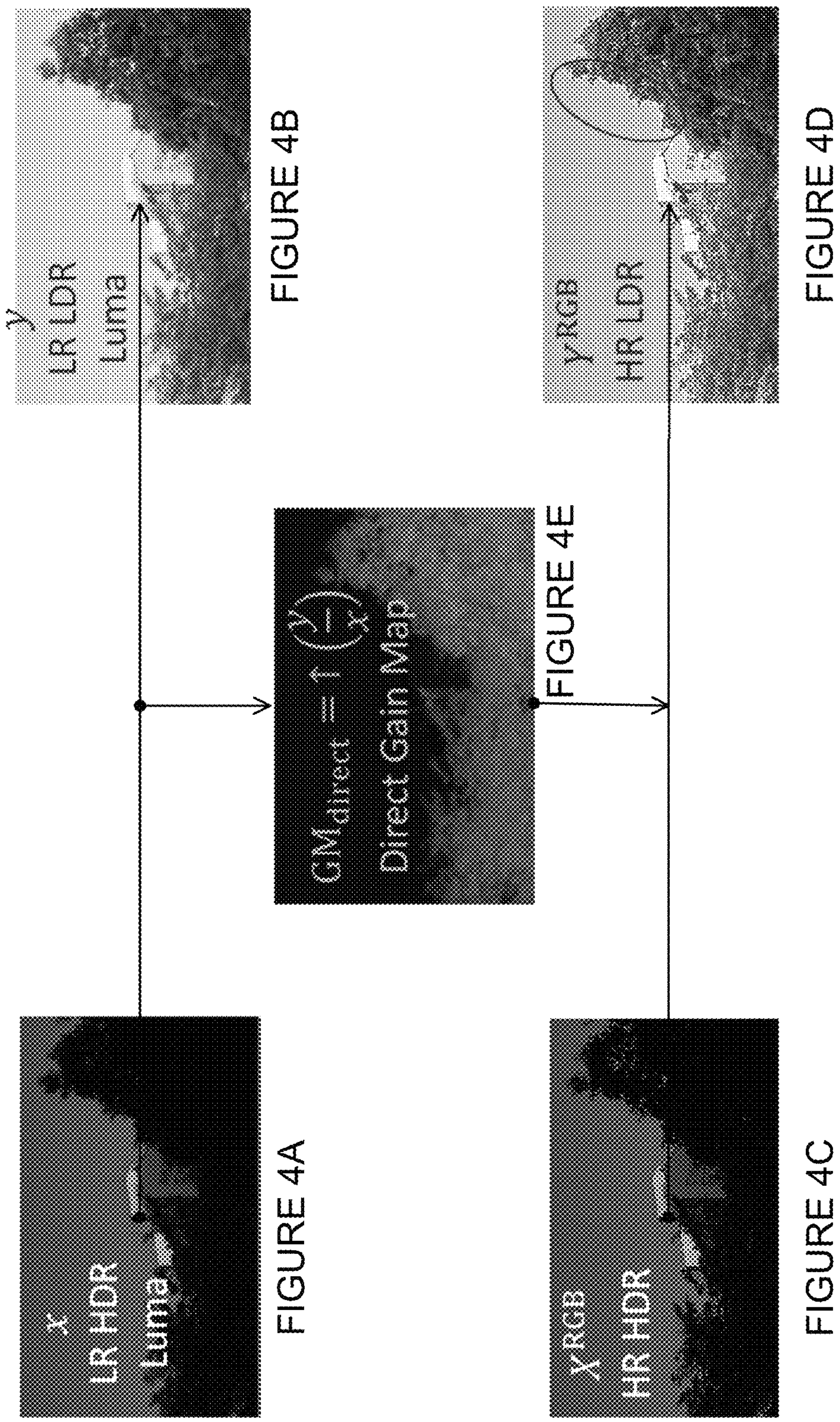
FIGS. 4A through 4E illustrate halos that can result from direct gain map tone mapping.

This approach results in halos in high contrast areas since noise from $x^{RGB}$ gets applied to the high resolution image. FIGS. 4A through 4E, each corresponding to the same image, illustrate such halos. FIG. 4A is luma (the weighted sum of gamma corrected RGB components) derived from a low resolution, high dynamic range image x and FIG. 4B is luma derived from a counterpart low resolution, low dynamic range image y. The two images in FIG. 4A and FIG. 4B may be used to determine a direct gain map $$GM_{direct} = \uparrow\left(\frac{y}{x}\right).$$

When the determined direct gain map $GM_{direct}$ is employed in tone mapping a high resolution, high dynamic range image $X^{RGB}$ depicted in FIG. 4C to produce a high resolution, low dynamic range image $Y^{RGB}$ depicted in FIG. 4D, halo artifacts occur in regions such as that corresponding to the tile of FIG. 4E. Because the gain map is computed for noisy, low resolution images only, fine detail is not captured causing halos and noise.

Figure 5B:
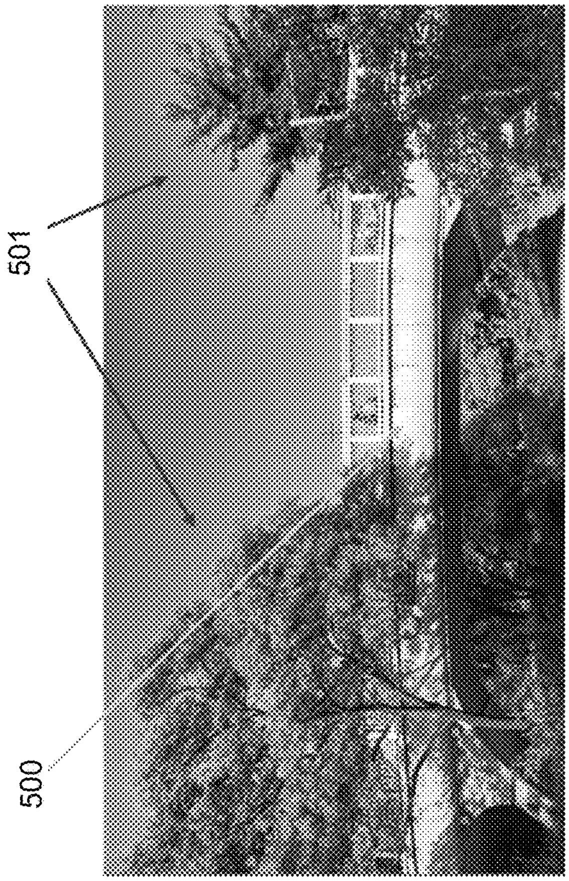
FIG. 5A and FIG. 5B illustrates stains and contrast loss that can result from direct gain map tone mapping.
Figure 5A:
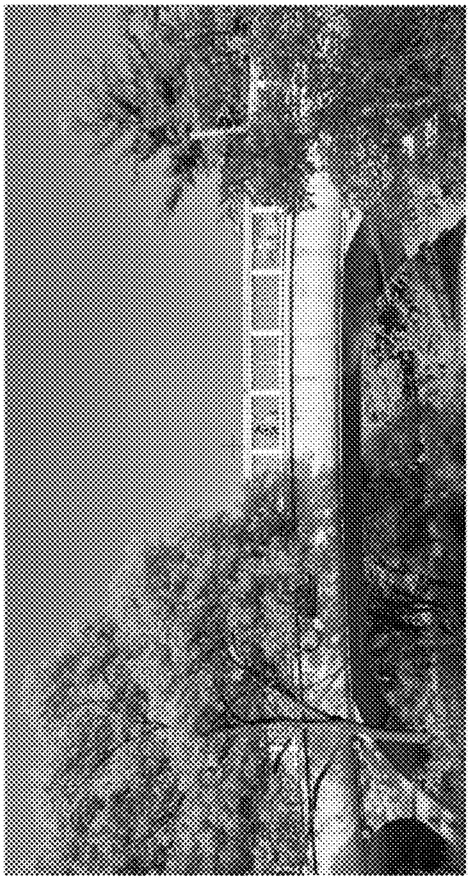

On the other hand, the profile gain table map approach employs smoothly varying lookup tables mapping $x^{RGB}$ to $y^{RGB}$, which are applied to $X^{RGB}$. This approach results in stains in smooth areas, contrast loss, or both. FIG. 5A and FIG. 5B, where FIG. 5A illustrates the desired output and FIG. 5B illustrates the output with the profile gain table map approach, illustrate such areas of stains 500 and poor contrast in texture 501.

In pipeline 300, tone mapping 306 is applied to the low resolution, noisy, high dynamic range image 305 ($x^{RGB}$) to produce a low resolution, noisy, RGB, low dynamic range image 307 ($y^{RGB}$). Tone mapping 306 is therefore similar to the direct gain map approach. The image 305 and the image 307 are then used in application of tone mapping 308 to the image 303 ($X^{RGB}$) to produce a tone mapped, high resolution, RGB, low dynamic range image 309.

The application of tone mapping 308 in pipeline 300 proceeds according to $$Y^{RGB} = \underbrace{GuidedFilter\left(\underbrace{\left(\frac{f(X)}{X}\right)}_{GM_{global}} * \underbrace{\left(\uparrow\left(\frac{y}{f(x)}\right)\right)}_{GM_{local}}\right)}_{Detail\ Enhancement} * X^{RGB} = GM * X^{RGB},$$

In the above equation, ↑ refers to an operation of up-sampling and denoising, which can be crude and fast since local gain has low dynamic range and is noisy when x and y are noisy. X=Luma($X^{RGB}$), with available high resolution detail being used to compute global gain $GM_{global}$. $f(x)$ is a lookup table, formed by $f(x)\approx y$, which is achieved initially by histogram matching of x and y, and $f(\bullet)$ being processed and regularized further so that is stable near $f(x)\approx 0$, is smooth, has positive slope, etc. GuidedFilter is a function smoothing out semi-flat regions of the gain map, causing more detail/contrast to be retained in final image $Y^{RGB}$.

At the time of execution, not all of the high resolution, high dynamic range image 303 ($X^{RGB}$) needs to be available, and therefore the processing can occur in tiles t:

$$Y_t^{RGB} = GuidedFilter\left(\underbrace{\left(\frac{f(X_t)}{X_t}\right)}_{GM_{global}} * GM_{local,t}\right) * X_t^{RGB} = GM_t * X_t^{RGB},$$

where t=1, . . . , $N_{tiles}$ indexes the $t^{th}$ tile. In the above, $f(\bullet)$ and $GM_{local}$ need to be computed before the first tile is processed.

The approach defined above employs a combination of a global gain map $GM_{global}$ with a local mapping $GM_{local,t}$ with overall gain expressed through two gain maps. The global component mostly handles the reduction from high dynamic range to low dynamic range, and is spatially very precise since the lookup table is based on a high resolution image. The local component expresses residual tone different between the global tone mapping and the total tone mapping. Since the local tone component is assumed to have small dynamic range, spatial accuracy is not required and the total tone component is less prone to cause halos and stains.

Separation of the global component and the local component allows selective denoising of the local gain component. The global component, being derived from a high resolution lookup table, does not add noise. The local component, being derived from the low resolution draft image, may contain noise but is selectively denoised. Crude and fast denoising is possible without degradation because the local component has relatively low amplitude.

Whenever the tone mapping input and output are known, the gain map is also refined to provide detail enhancement independent of the two component gain map, to improve detail and contrast.

Although FIG. 3 illustrates one example of a pipeline 300 for employing low resolution, noisy tone mapping operations for high resolution images in accordance with this disclosure, various changes may be made to FIG. 3. For example, various blocks may be combined or interconnected so that pipelined or real time performance is improved.

Figure 6:
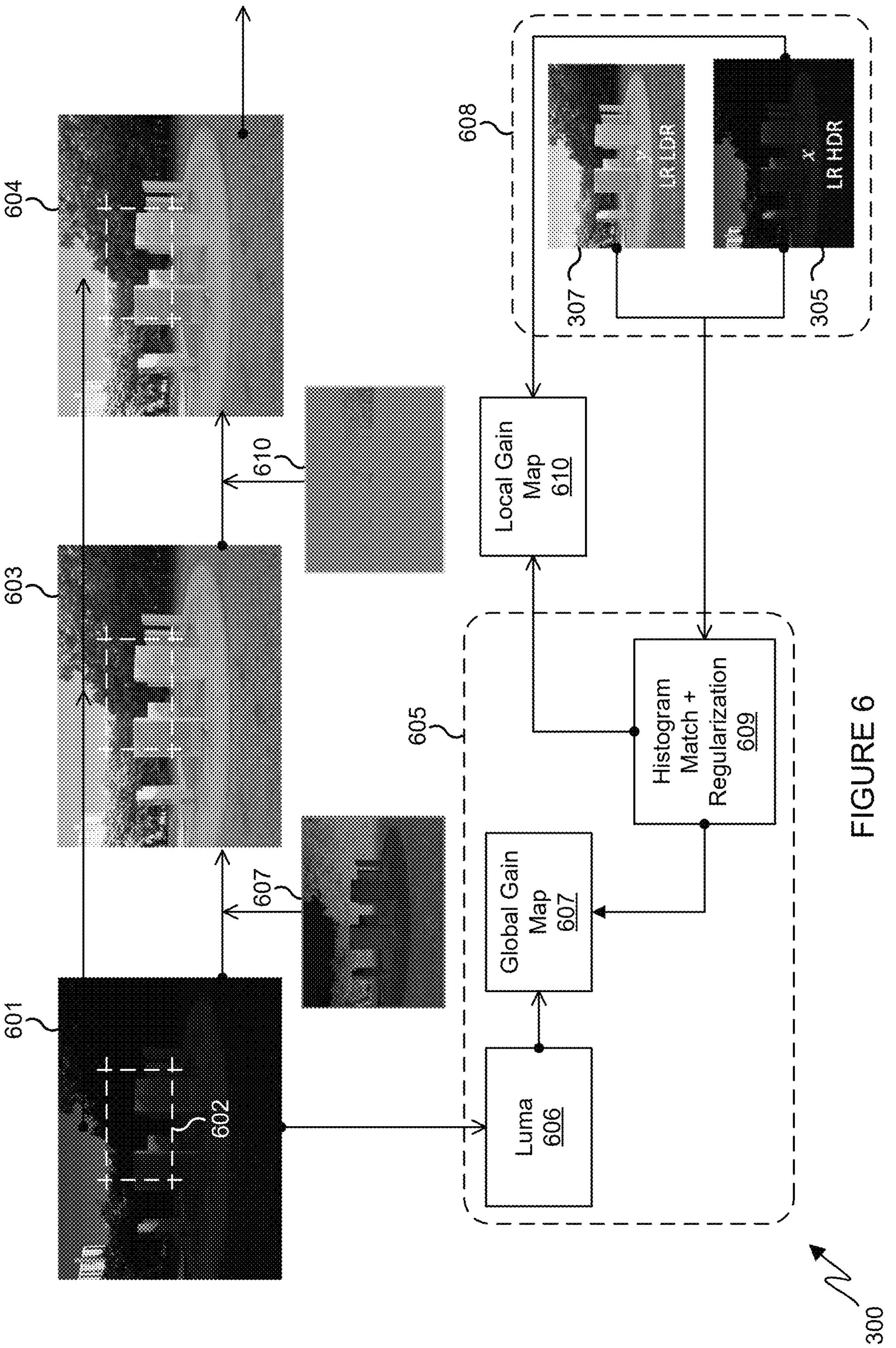
FIG. 6 illustrates operation of the pipeline of FIG. 3 and the associated tone mapping functions, with images for operational context.

FIG. 6 illustrates operation of the pipeline 300 of FIG. 3 and the tone mapping functions described above, with images for operational context. Tone mapping within the pipeline 300 uses a high resolution, high dynamic range image 601 ($X^{RGB}$) that requires tone mapping to adjust brightness and contrast. The image 601 may be the output of the advanced processing 302, based on raw input frames 301. The image 601 is processed in tiles, with area 602 representing one tile. Images 603 and 604 are generated as processed tiles of image 601 become available.

Within the high resolution tone mapping processes 605, luma processing 606 is performed on image 601 using X=Luma ($X^{RGB}$). The output of luma processing 606 is used to generate a global gain map 607 using $$\frac{f(X)}{X},$$

which is processed in tiles. Within the low resolution tone mapping processes 608 (which includes tone mapping 306), a low resolution, high dynamic range image 305 (x) and low resolution, low dynamic range image 307 (y) for each tile are used for histogram matching and regularization 609, based on a lookup table function $f$:LUT that is regularized by $f(x)\approx y$. The output of histogram matching and regularization 609, together with the low resolution, high dynamic range image 305, is used to generate a local gain map 610 using the up-sampling function $$\uparrow\left(\frac{y}{f(x)}\right)$$

and then denoising the result. The original high resolution, high dynamic range image 601 is tone mapped using the global gain map 607 to generate an intermediate image 603, which is then tone mapped using the local gain map 610 to generate a fully tone mapped image 604. Image 604 may be further processed for further refinement (e.g., detail/contrast enhancement).

In some embodiments, computation of the function $f(\bullet)$ proceeds by finding the auxiliary number α chosen such that $(\Sigma_i x_i)^\alpha \approx \Sigma_i y_i$:

$$\alpha = \frac{\log \sum_i y_i}{\log \sum_i x_i}.$$

Next, the auxiliary lookup table $F_0$ is computed, derived using standard histogram matching between the histograms of $x^\alpha$ and y:

$$F_0 = HistogramMatch(x^\alpha, y), \text{ i.e., } F_0(x^\alpha) \approx y.$$

$F(\bullet)$ is derived from $F_0(\bullet)$ in order to regularize the mapping. A space-variant triangle filter kernel may be utilized to smooth out $F_0$ while keeping the upper and lower boundaries of the lookup table mostly the same, which ensures that F has positive slope for most or all values of $x^\alpha$ and $X^\alpha$. The final lookup table $f$ is simply shorthand for $f(x)=F(x^\alpha)$.

The lookup table $f(\bullet)$ is an approximation ensuring that $f(x)\approx y$, such that the histogram of $f(x)$ approximately matches the histogram of y. The closer the match, the closer the residual (local gain $GM^{local}$) is to 1:

$$GM^{local} \leftarrow USDN\left(\frac{y}{f(x)}\right),$$

where USDN may be a unified sample-wise dynamic network. Since $y/f(x)$ can still be noisy in dark regions, the local gain $GM^{local}$ needs to be denoised, which necessarily causes detail loss. However, the effects are negligible because the local gain has very little amplitude.

Figure 7B:
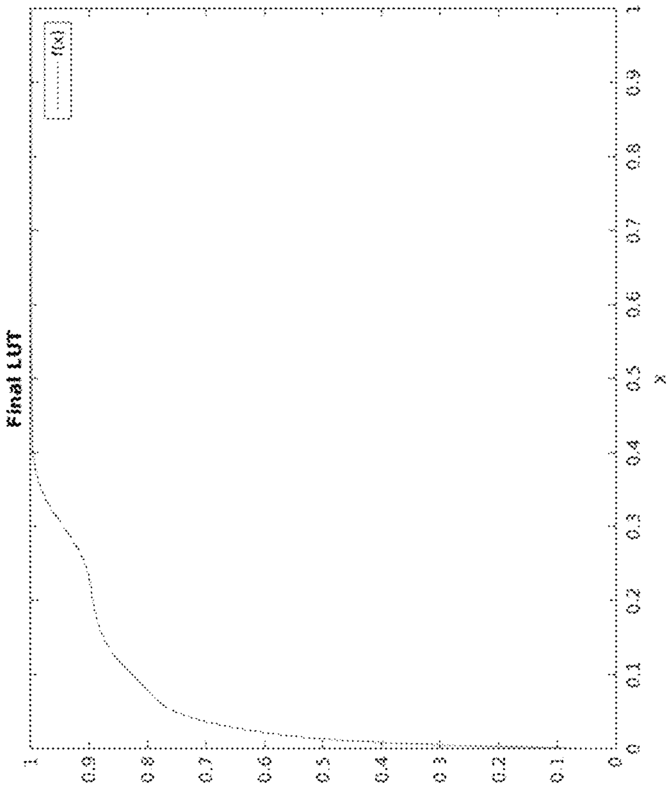
FIGS. 7A and 7B illustrate the relationship of the final lookup table to the histograms used for deriving that lookup table in accordance with this disclosure.
Figure 7A:
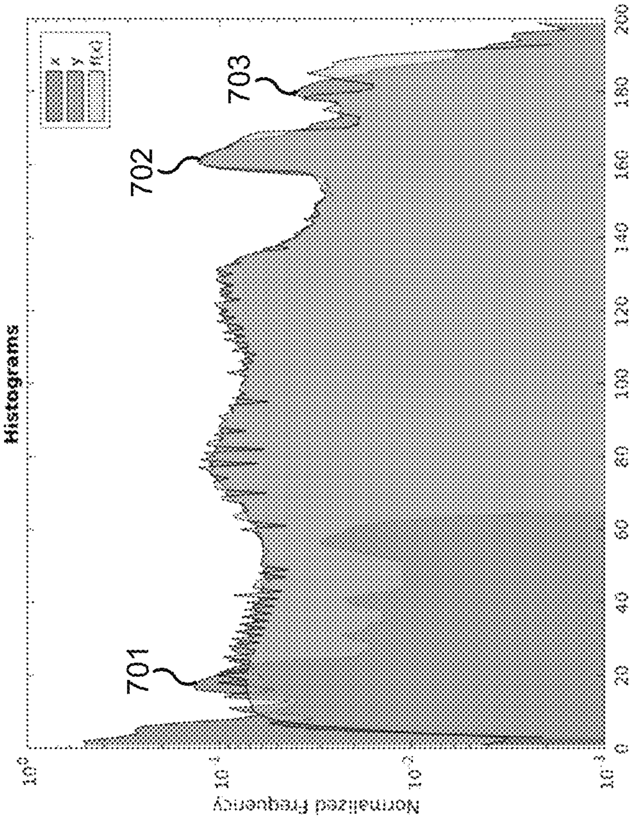
Figure 8A:
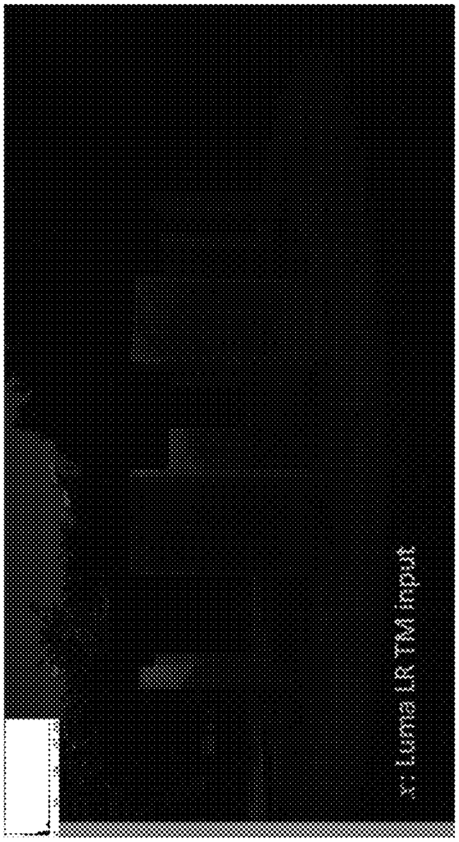
FIGS. 8A through 8D depict image data corresponding to FIGS. 7A and 7B.
Figure 8B:
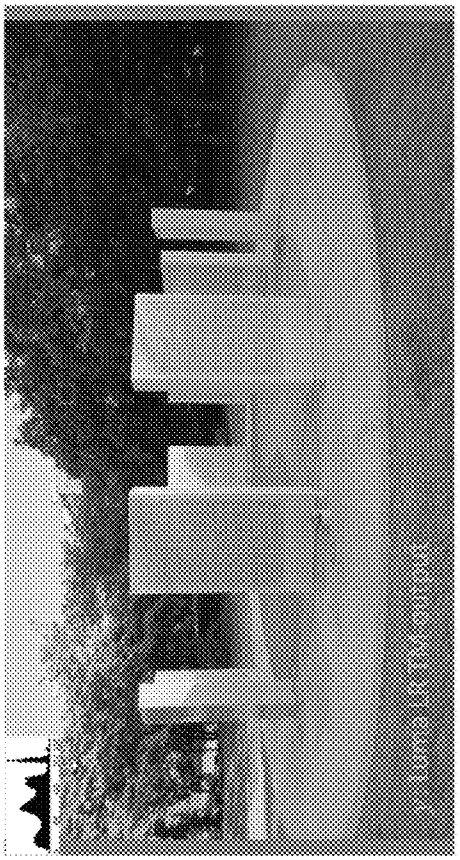
Figure 8C:
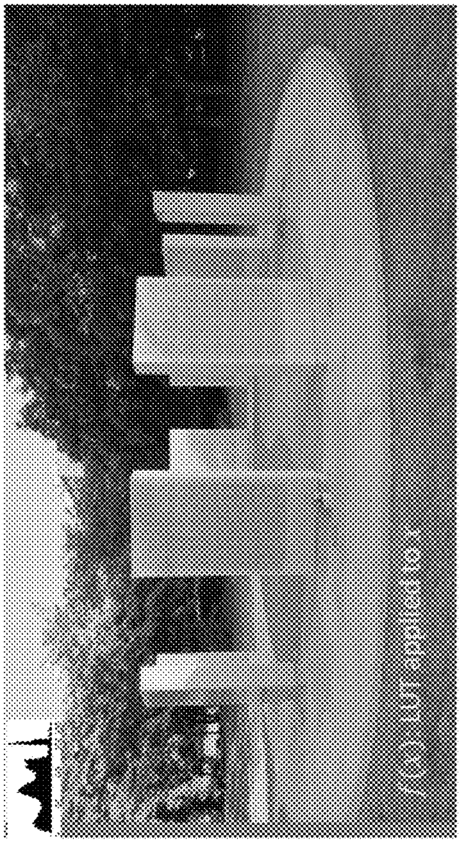
Figure 8D:
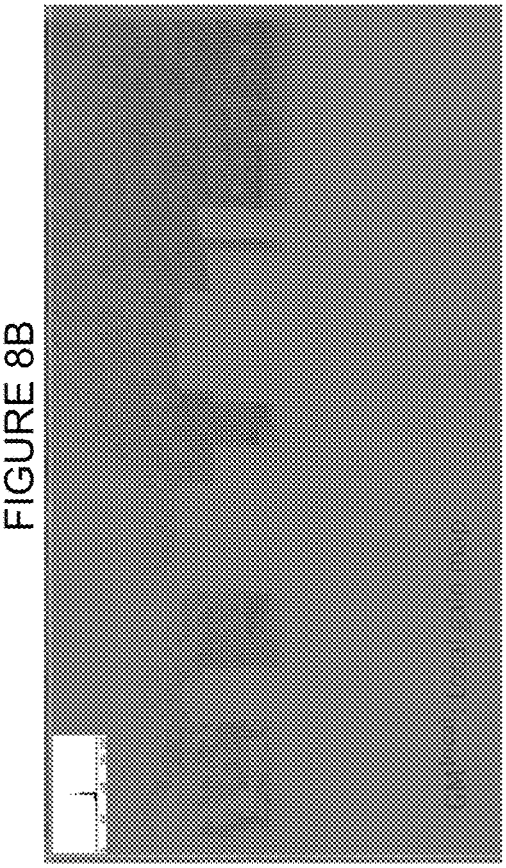

Using the same images as in FIG. 6, FIGS. 7A and 7B illustrate the relationship of the final lookup table to the histograms used for deriving that lookup table, and FIGS. 8A through 8D depict corresponding image data. FIG. 7A depicts a histogram 701 for x, a histogram 702 for y, and a histogram 703 for $f(x)$. FIG. 7B depicts the counterpart lookup table. FIG. 8A illustrates the luma of a low resolution tone mapping input x corresponding to the histogram 701. FIG. 8B illustrates the luma of a low resolution tone mapping output y corresponding to the histogram 702. FIG. 8C illustrates the lookup table $f(x)$ applied to x. FIG. 8D illustrates the local gain ($GM^{local}$) map.

Figure 9A:
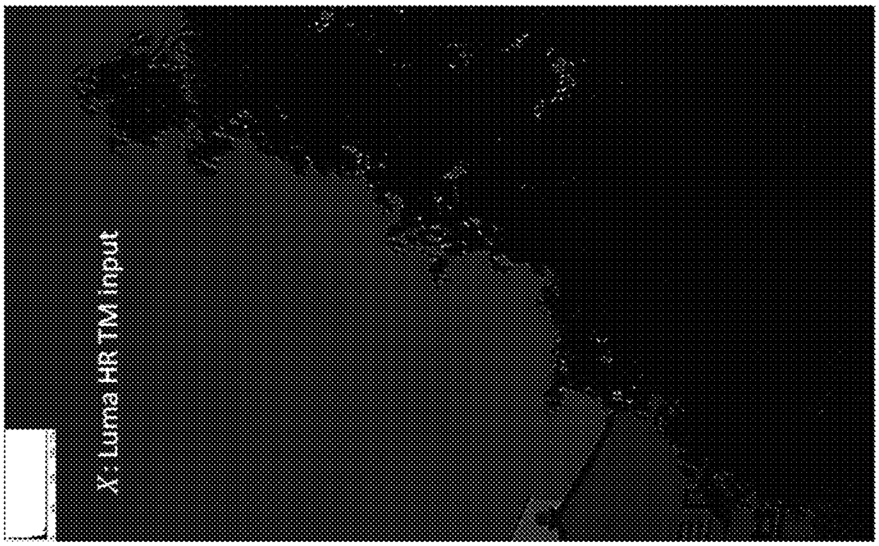
FIGS. 9A through 9C depict image data corresponding to global gain determined in accordance with this disclosure.
Figure 9B:
Figure 9C:
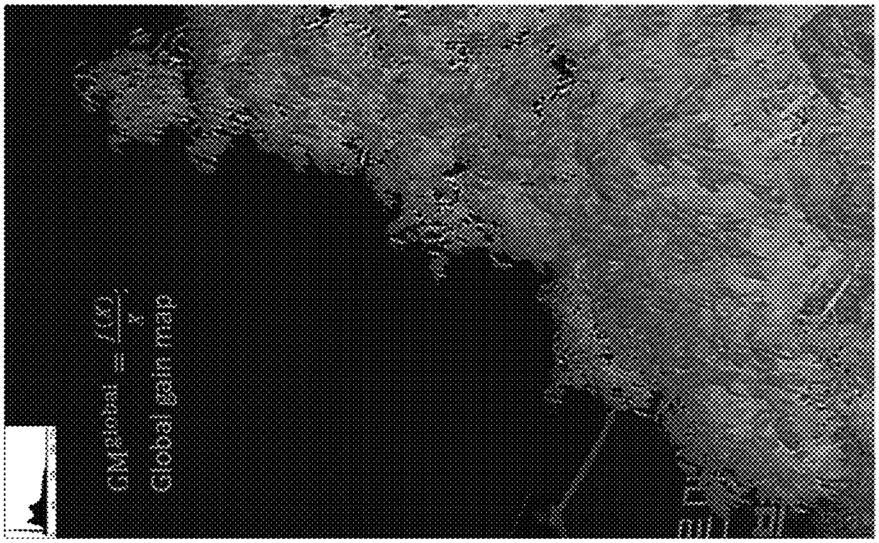

The global gain map $GM^{global}$ is computed using the lookup table $f(\bullet)$ and the high resolution luma image X (that is, $f(X)$). Using portions of the same images as in FIGS. 4A through 4D, FIGS. 9A through 9C depict image data corresponding to global gain determined in accordance with this disclosure. FIG. 9A illustrates the luma of a high resolution tone mapping input X. FIG. 9B illustrates $f(X)$, the lookup table $f(\bullet)$ applied to the high resolution luma image X. FIG. 9C illustrates the global gain map $GM^{global}=f(X)/X$. Because the global gain map $GM^{global}$ is computed using the lookup table $f(\bullet)$ and the high resolution luma image X, the global gain is able to resolve fine details as shown in FIGS. 9A through 9C. By contrast, the direct gain map $GM^{direct}$ determined as described in the Background is not able to resolve fine details since only the low resolution input x is used, and not the high resolution input X.

Figure 10A:
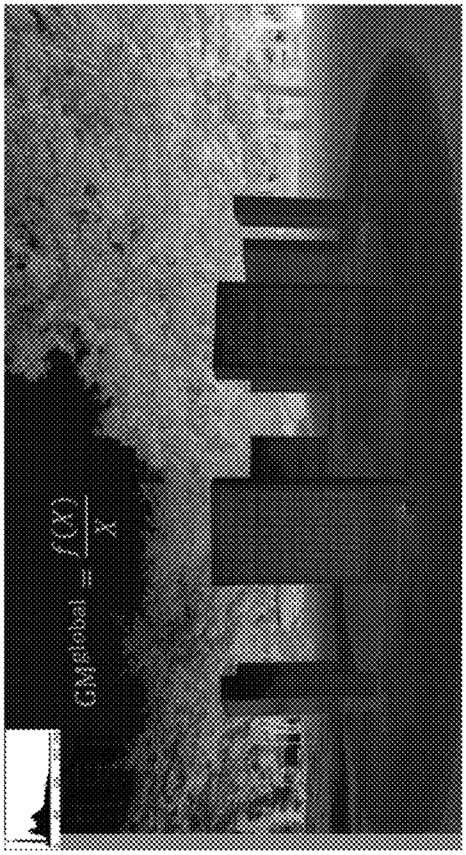
FIGS. 10A through 10D depict image data corresponding to application of global gain and total gain in accordance with this disclosure.
Figure 10B:
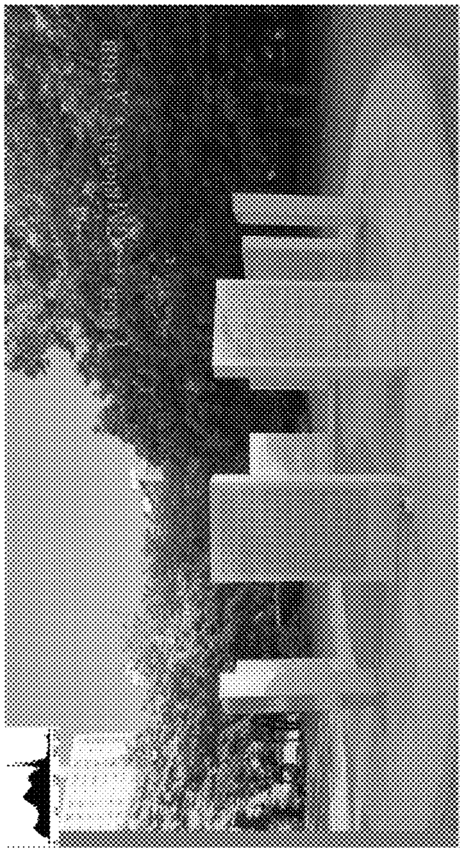
Figure 10C:
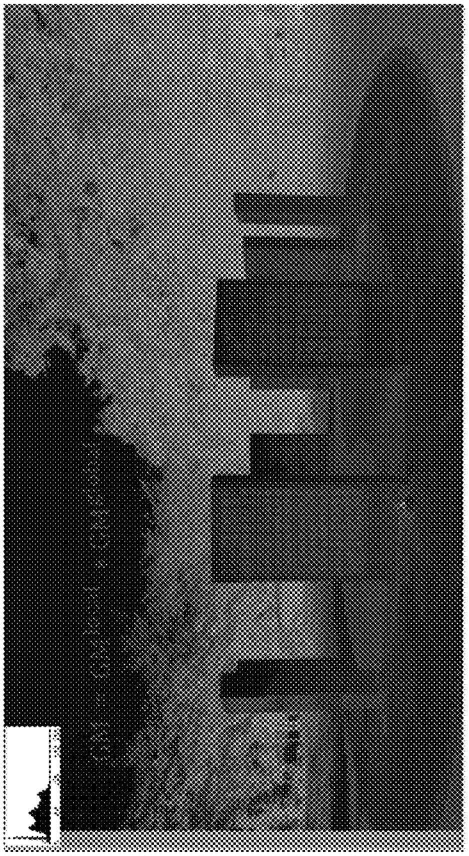
Figure 10D:
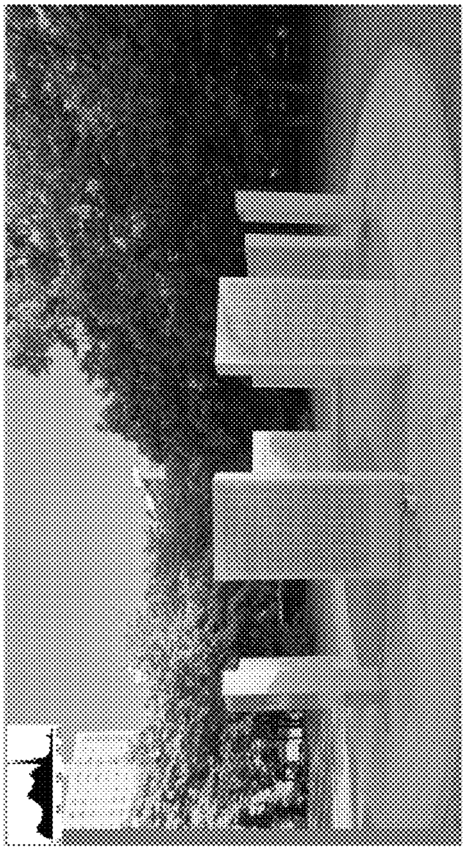

Again, using the same images as in FIG. 6, FIGS. 10A through 10D depict image data corresponding to application of global gain and total gain in accordance with this disclosure. FIG. 10A illustrates the global gain map $GM^{global}$ and FIG. 10B illustrates application of the global gain to a high resolution, high dynamic range image $X^{RGB}$ (i.e., $Y^{RGB} \leftarrow GM^{global} * X^{RGB}$). FIG. 10C illustrates the total gain map $GM=GM^{local}*GM^{global}$ and FIG. 10D illustrates application of the total gain to a high resolution, high dynamic range image $X^{RGB}$ (i.e., $Y^{RGB} \leftarrow GM * X^{RGB}$). The tone of the global gain map $GM^{global}$ dominates the total gain map GM, which enables use of heavier denoising on the noisy local gain map $GM^{local}$ without causing visible artifacts.

Figure 11A:
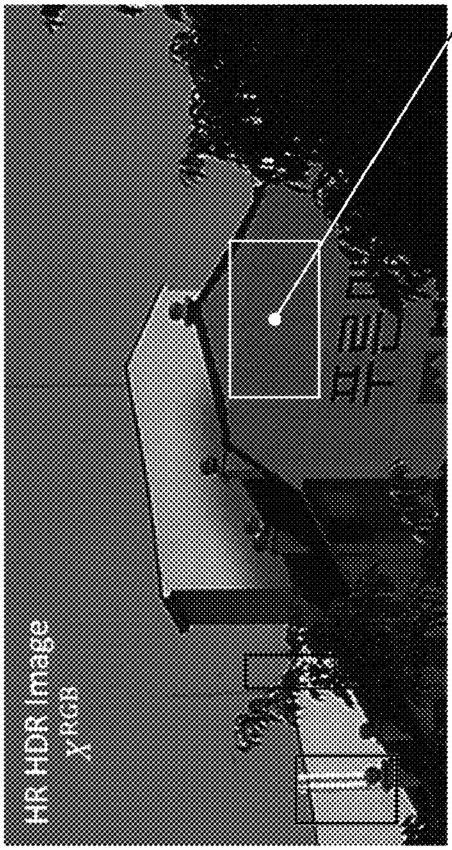
FIGS. 11A through 11D illustrate detail improvement through refinement of the total gain map in accordance with this disclosure.
Figure 11B:
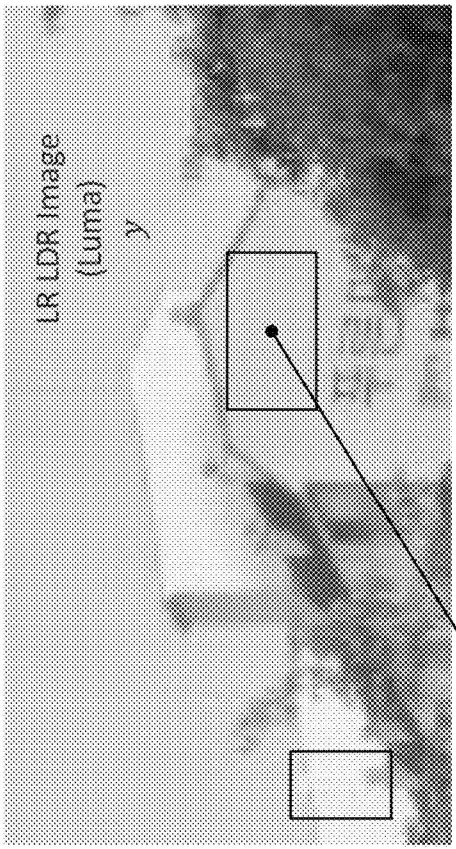
Figure 11C:
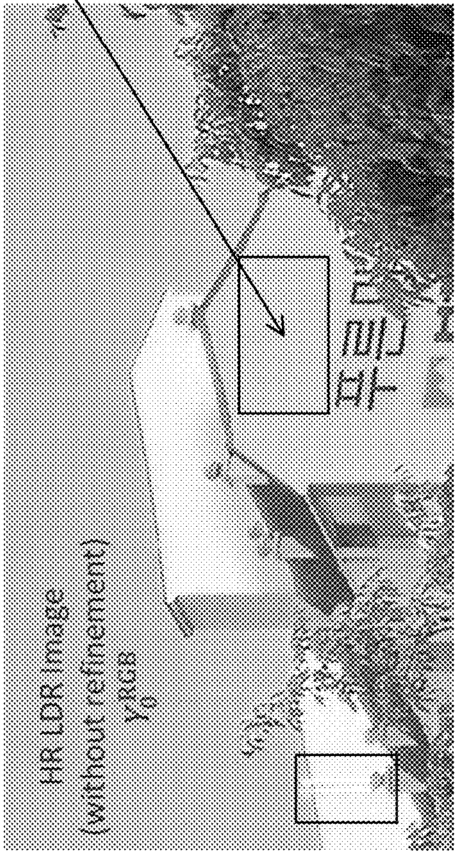
Figure 11D:
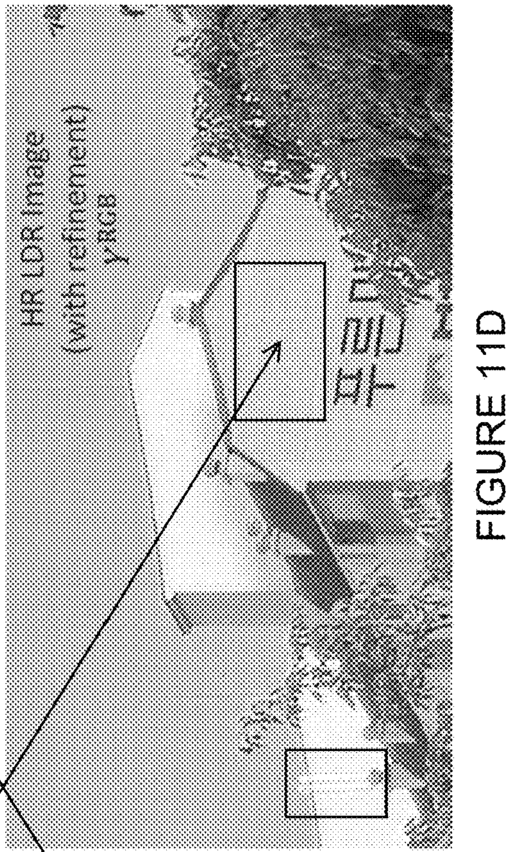

Using portions of the same images as in FIGS. 4A through 4D, FIGS. 11A through 11D illustrate detail improvement through refinement of the total gain map GM in accordance with this disclosure. The total gain map GM is computed to match the low resolution, low dynamic range (luma) image (y) shown in FIG. 11B and high resolution, low dynamic range image $$\left(Y_0^{RGB} \leftarrow GM * X^{RGB}\right)$$

shown in FIG. 11C. When the high resolution image contains fine details and textures, the low resolution image tome does not contain enough information about the tone of those details. Through gain map refinement, the details from the high resolution, high dynamic range image ($X^{RGB}$) shown in FIG. 11A are brought to the high resolution, low dynamic range image ($Y^{RGB} \leftarrow \text{GuidedFilter}(GM)*X^{RGB}$) shown in FIG. 11D.

Figure 12C:
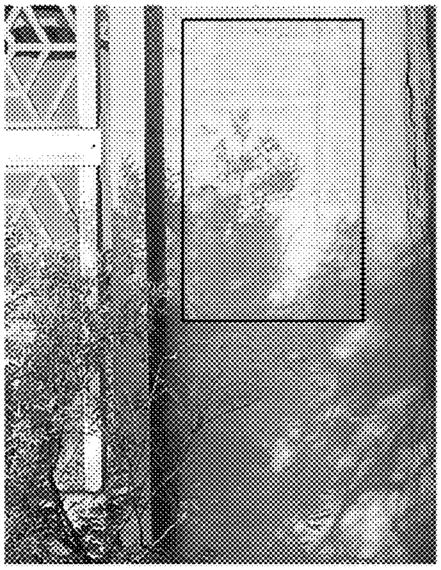
FIGS. 12A through 12C comparatively illustrate detail improvement in tone mapping using the direct gain map approach as described in the Background versus low resolution, noisy tone mapping operations for high resolution images in accordance with this disclosure.
Figure 12B:
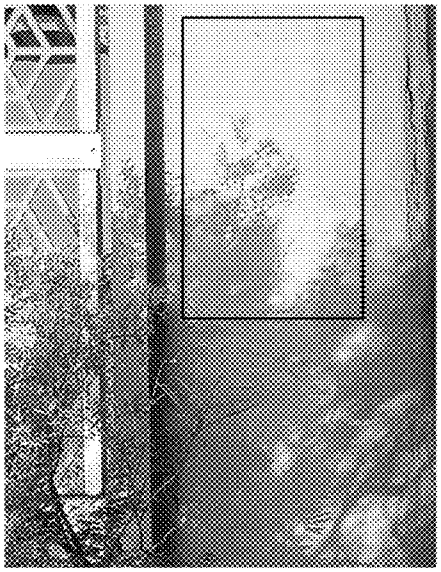
Figure 12A:
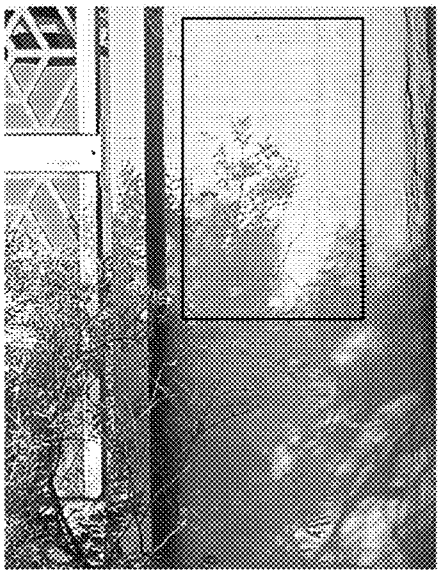

FIGS. 12A through 12C comparatively illustrate detail improvement in tone mapping using the direct gain map approach as described in the Background versus low resolution, noisy tone mapping operations for high resolution images in accordance with this disclosure. FIG. 12A illustrates an image after tone mapping using a direct gain map. The region indicated exhibits high contrast, but is over-enhanced and includes halos. FIG. 12B illustrates the same image after tone mapping according to this disclosure, without gain map refinement. The corresponding indicated area exhibits low contrast. FIG. 12C illustrates the same image after tone mapping according to this disclosure, with gain map refinement. The corresponding indicated area exhibits high contrast.

Figure 13B:
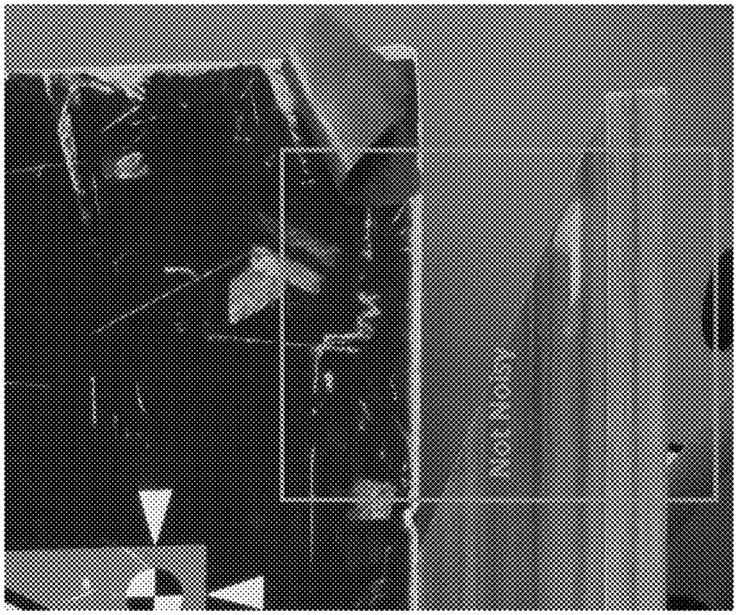
FIGS. 13A and 13B comparatively illustrate noise improvement in tone mapping using the direct gain map approach as described in the Background versus low resolution, noisy tone mapping operations for high resolution images in accordance with this disclosure.
Figure 13A:

FIGS. 13A and 13B comparatively illustrate noise improvement in tone mapping using the direct gain map approach as described in the Background versus low resolution, noisy tone mapping operations for high resolution images in accordance with this disclosure. FIG. 13A is an image after tone mapping using a direct gain map. The noise within the region indicated is inherent in the low resolution, high dynamic resolution image x, causing a noisy direct gain map and thus a noisy high resolution, low dynamic range output. Aggressive denoising would cause increase of haloing, such that there is a trade off between noise and halos. FIG. 13B is an image after tone mapping in accordance with the present disclosure. With the approach of the present disclosure, the global tone can be separated from the local tone gain such that more aggressive denoising to the local tone is possible, resulting in less overall noise output within the region indicated.

Figure 14A:
FIGS. 14A through 14D comparatively illustrate tone mapping using the direct gain map approach as described in the Background versus low resolution, noisy tone mapping operations for high resolution images in accordance with this disclosure.
Figure 14B:
Figure 14C:
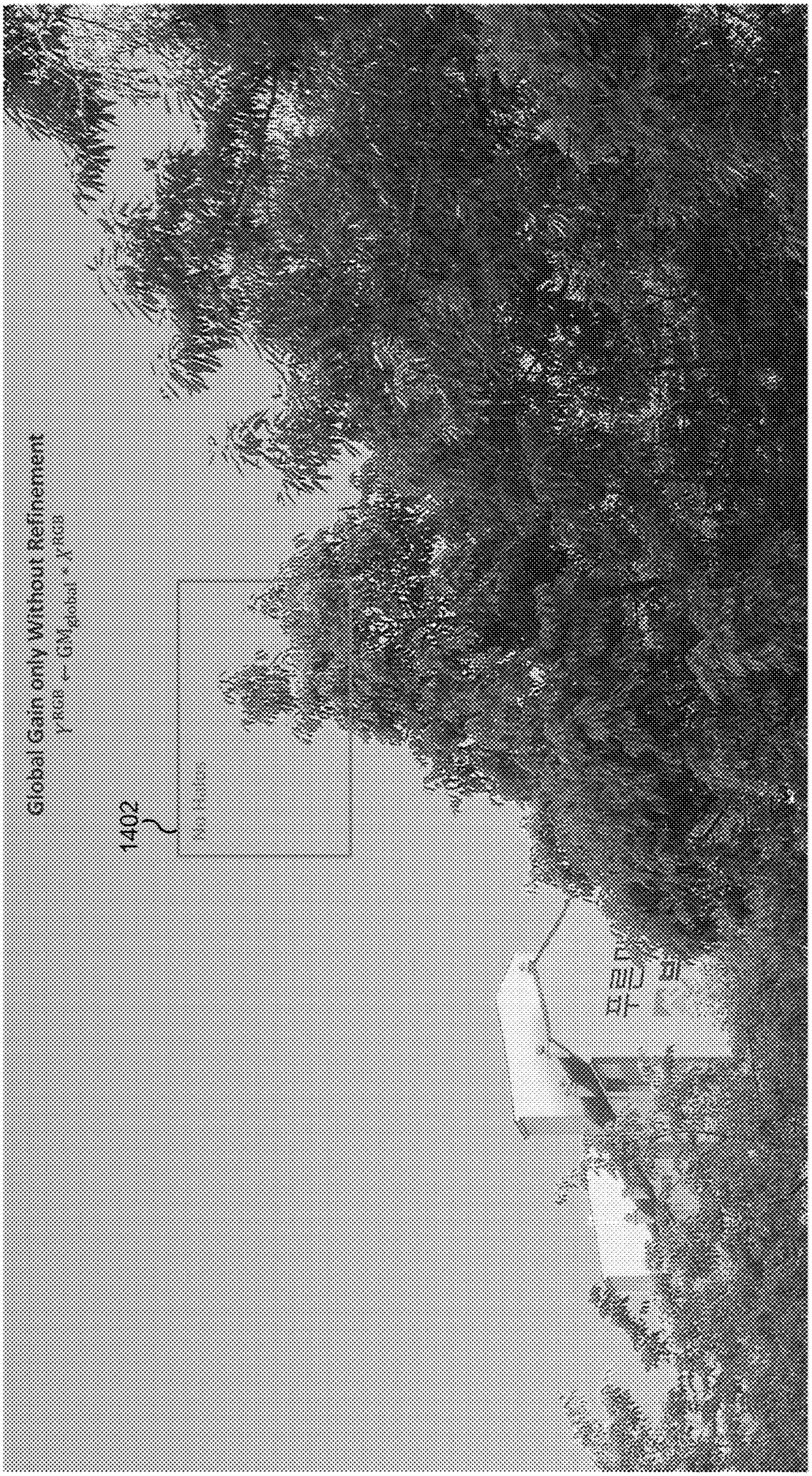
Figure 14D:

FIGS. 14A through 14D comparatively illustrate tone mapping using the direct gain map approach as described in the Background versus low resolution, noisy tone mapping operations for high resolution images in accordance with this disclosure. FIG. 14A is low resolution, low dynamic luma (y). FIG. 14B is the same image after tone mapping using the direct gain map approach as described in the Background ($Y^{RGB} \leftarrow GM_{direct}*X^{RGB}$), where the indicated region 1401 exhibits halos. FIG. 14C is the same image after tone mapping in accordance with this disclosure, without total gain map refinement (e.g., $Y^{RGB} \leftarrow GM_{global*X}{}^{RGB}$). The indicated region 1402 contains no halos. FIG. 14D is the same image after tone mapping in accordance with this disclosure with total gain map refinement (e.g., $Y^{RGB} \leftarrow \text{GuidedFilter}(GM_{global}*GM_{local})*X^{RGB}$). The first indicated region 1403 exhibits no halos and the second indicated region 1404 exhibits high contrast.

Figure 15A:
FIGS. 15A through 15D also comparatively illustrate tone mapping using the direct gain map approach as described in the Background versus low resolution, noisy tone mapping operations for high resolution images in accordance with this disclosure.
Figure 15B:
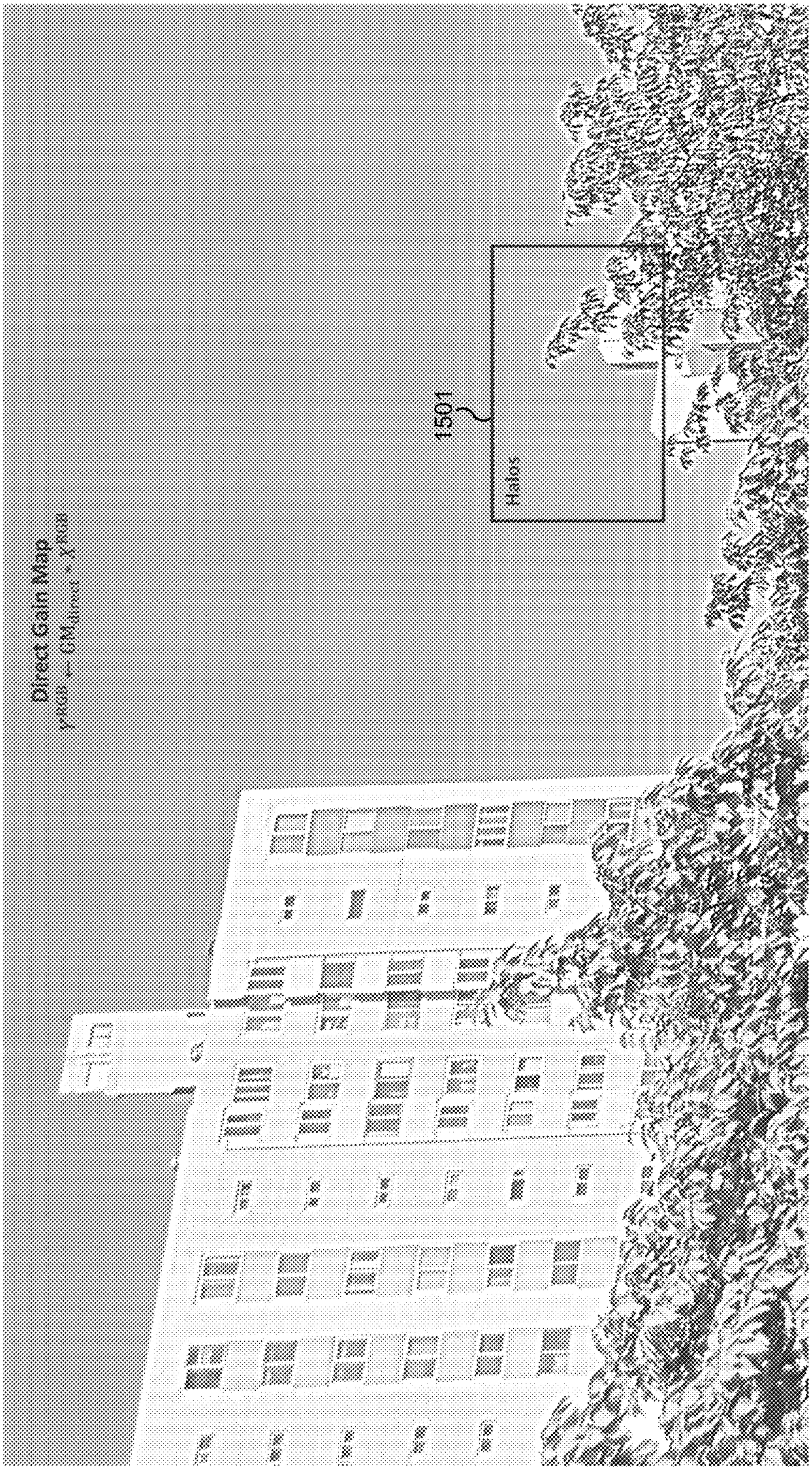
Figure 15C:
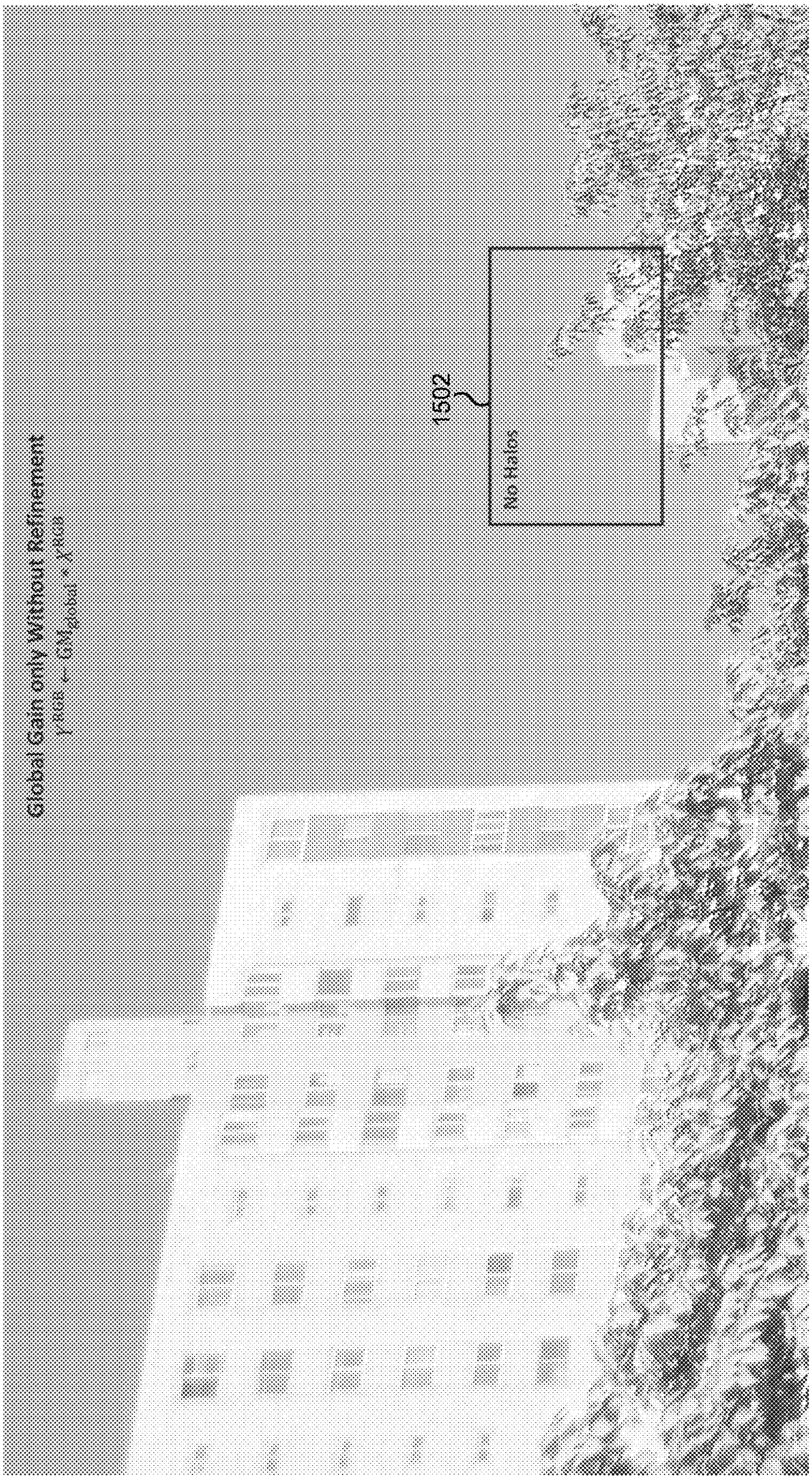
Figure 15D:
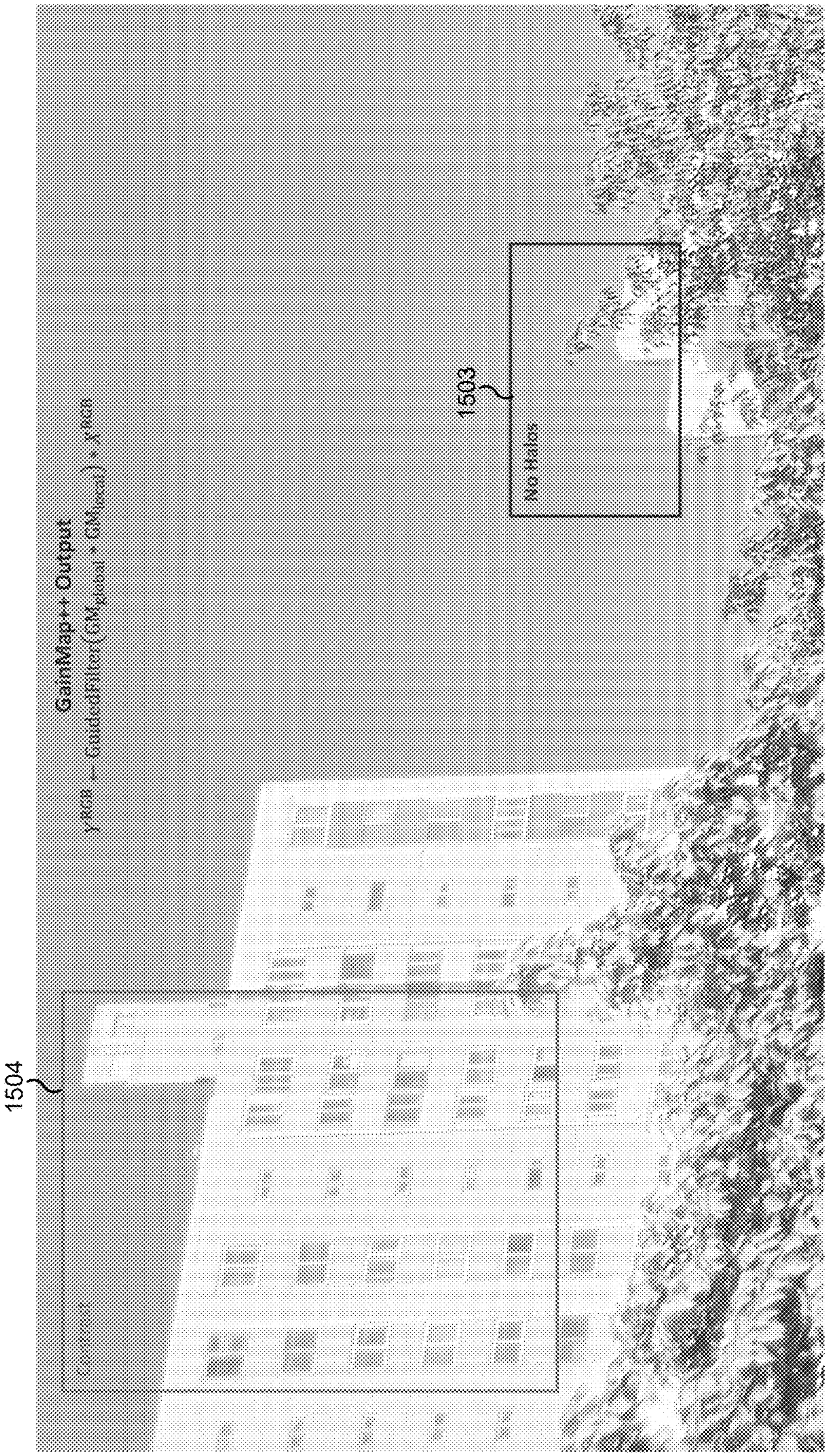

FIGS. 15A through 15D also comparatively illustrate tone mapping using the direct gain map approach as described in the Background versus low resolution, noisy tone mapping operations for high resolution images in accordance with this disclosure. FIG. 15A is low resolution, low dynamic luma (y). FIG. 15B is the same image after tone mapping using the direct gain map approach as described in the Background ($Y^{RGB} \leftarrow GM_{direct}*X^{RGB}$), where the indicated region 1501 exhibits halos. FIG. 15C is the same image after tone mapping in accordance with this disclosure, without total gain map refinement (e.g., $Y^{RGB} \leftarrow GM_{global}*X^{RGB}$). The indicated region 1502 contains no halos. FIG. 15D is the same image after tone mapping in accordance with this disclosure with total gain map refinement (e.g., $Y^{RGB} \leftarrow \text{GuidedFilter}(GM_{global}*GM_{local})*X^{RGB}$). The first indicated region 1503 exhibits no halos and the second indicated region 1504 exhibits high contrast.

It should be noted that the functions shown in the figures or described above can be implemented in an electronic device 101, 102, 104, server 106, or other device(s) in any suitable manner. For example, in some embodiments, at least some of the functions shown in the figures or described above can be implemented or supported using one or more software applications or other software instructions that are executed by the processor 120 of the electronic device 101, 102, 104, server 106, or other device(s). In other embodiments, at least some of the functions shown in the figures or described above can be implemented or supported using dedicated hardware components. In general, the functions shown in the figures or described above can be performed using any suitable hardware or any suitable combination of hardware and software/firmware instructions. Also, the functions shown in the figures or described above can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

converting at least one raw image frame to a first image at a first resolution and a second image at a second resolution, wherein the second resolution is lower than the first resolution;

applying tone mapping to the second image to derive a third image at the second resolution;

performing histogram matching and regularization using the second image and the third image to determine a lookup table approximating histogram matching of the second image to the third image;

deriving a global gain map for tone mapping based on luma for the first image and the lookup table;

deriving a local gain map by up-sampling and denoising residual differences between the third image and the lookup table applied to the second image after regularization of the lookup table; and based on the global gain map and the local gain map, determining a total gain map for tone mapping the first image to produce a fourth image at the first resolution.

2. The method of claim 1, further comprising:

refining the total gain map based the first image to retain detail and contrast from the first image in a filtered gain map.

3. The method of claim 2, further comprising:

applying the filtered gain map to the first image to produce a fifth image at the first resolution.

4. The method of claim 1, wherein the global gain map is derived from a ratio of the lookup table applied to the luma for the first image and the luma for the first image.

5. The method of claim 1, wherein the local gain map is derived from a ratio of the third image and the lookup table applied to the second image.

6. The method of claim 1, wherein, when the first image is processed in tiles, the global gain map is derived in tiles until all tiles have been processed.

7. The method of claim 1, wherein one or more of warping, blending, or demosaicing is applied to the at least one raw image frame to produce the first image at the first resolution and to produce the second image at the second resolution.

8. An electronic device comprising:

a memory storing image data; and at least one processing device configured to:

convert at least one raw image frame to a first image at a first resolution and a second image at a second resolution, wherein the second resolution is lower than the first resolution;

apply tone mapping to the second image to derive a third image at the second resolution;

perform histogram matching and regularization using the second image and the third image to determine a lookup table approximating histogram matching of the second image to the third image;

derive a global gain map for tone mapping based on luma for the first image and the lookup table;

derive a local gain map by up-sampling and denoising residual differences between the third image and the lookup table applied to the second image after regularization of the lookup table; and based on the global gain map and the local gain map, determine a total gain map for tone mapping the first image to produce a fourth image at the first resolution.

9. The electronic device of claim 8, wherein the at least one processing device is further configured to:

refine the total gain map based the first image to retain detail and contrast from the first image in a filtered gain map.

10. The electronic device of claim 9, wherein the at least one processing device is further configured to:

apply the filtered gain map to the first image to produce a fifth image at the first resolution.

11. The electronic device of claim 8, wherein the global gain map is derived from a ratio of the lookup table applied to the luma for the first image and the luma for the first image.

12. The electronic device of claim 8, wherein the local gain map is derived from a ratio of the third image and the lookup table applied to the second image.

13. The electronic device of claim 8, wherein, when the first image is processed in tiles, the global gain map is derived in tiles until all tiles have been processed.

14. The electronic device of claim 8, wherein one or more of warping, blending, or demosaicing is applied to the at least one raw image frame to produce the first image at the first resolution and to produce the second image at the second resolution.

15. A non-transitory machine-readable medium containing instructions that when executed cause at least one processor to:

convert at least one raw image frame to a first image at a first resolution and a second image at a second resolution, wherein the second resolution is lower than the first resolution;

apply tone mapping to the second image to derive a third image at the second resolution;

perform histogram matching and regularization using the second image and the third image to determine a lookup table approximating histogram matching of the second image to the third image;

derive a global gain map for tone mapping based on luma for the first image and the lookup table;

derive a local gain map by up-sampling and denoising residual differences between the third image and the lookup table applied to the second image after regularization of the lookup table; and based on the global gain map and the local gain map, determine a total gain map for tone mapping the first image to produce a fourth image at the first resolution.

16. The non-transitory machine-readable medium of claim 15, wherein the instructions when executed cause the at least one processor to:

refine the total gain map based the first image to retain detail and contrast from the first image in a filtered gain map.

17. The non-transitory machine-readable medium of claim 16, wherein the instructions when executed cause the at least one processor to:

apply the filtered gain map to the first image to produce a fifth image at the first resolution.

18. The non-transitory machine-readable medium of claim 15, wherein the global gain map is derived from a ratio of the lookup table applied to the luma for the first image and the luma for the first image.

19. The non-transitory machine-readable medium of claim 15, wherein the local gain map is derived from a ratio of the third image and the lookup table applied to the second image.

20. The non-transitory machine-readable medium of claim 15, wherein, when the first image is processed in tiles, the global gain map is derived in tiles until all tiles have been processed.

* * * * *